Sept. 20, 1927.　　　　A. W. WADLEY　　　　1,643,141
TREE REMOVER
Filed June 24, 1926　　　　3 Sheets-Sheet 1

WITNESSES

INVENTOR
A. W. Wadley
BY
ATTORNEYS

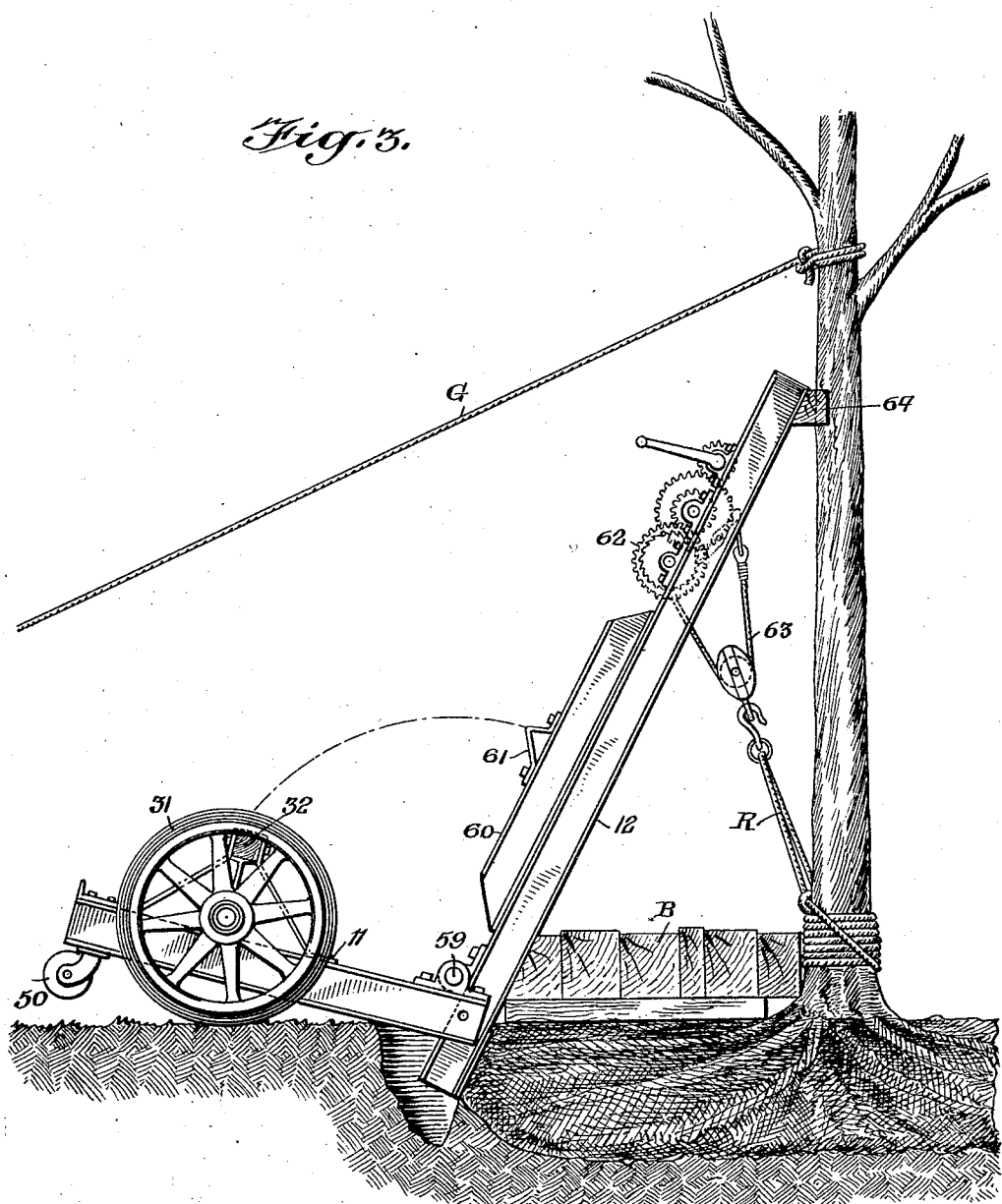

Sept. 20, 1927.  1,643,141
A. W. WADLEY
TREE REMOVER
Filed June 24, 1926   3 Sheets-Sheet 3
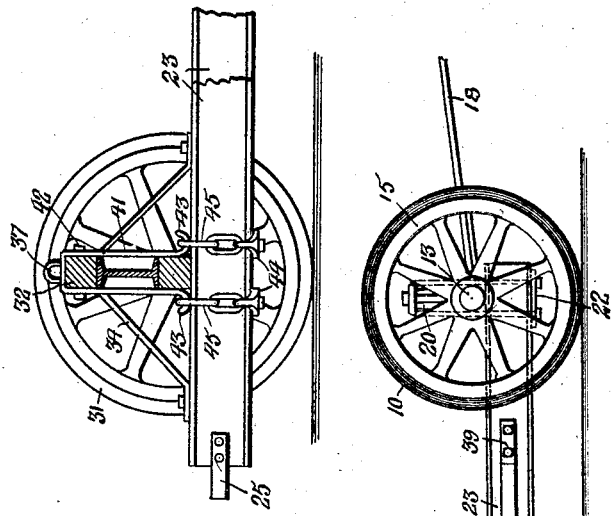
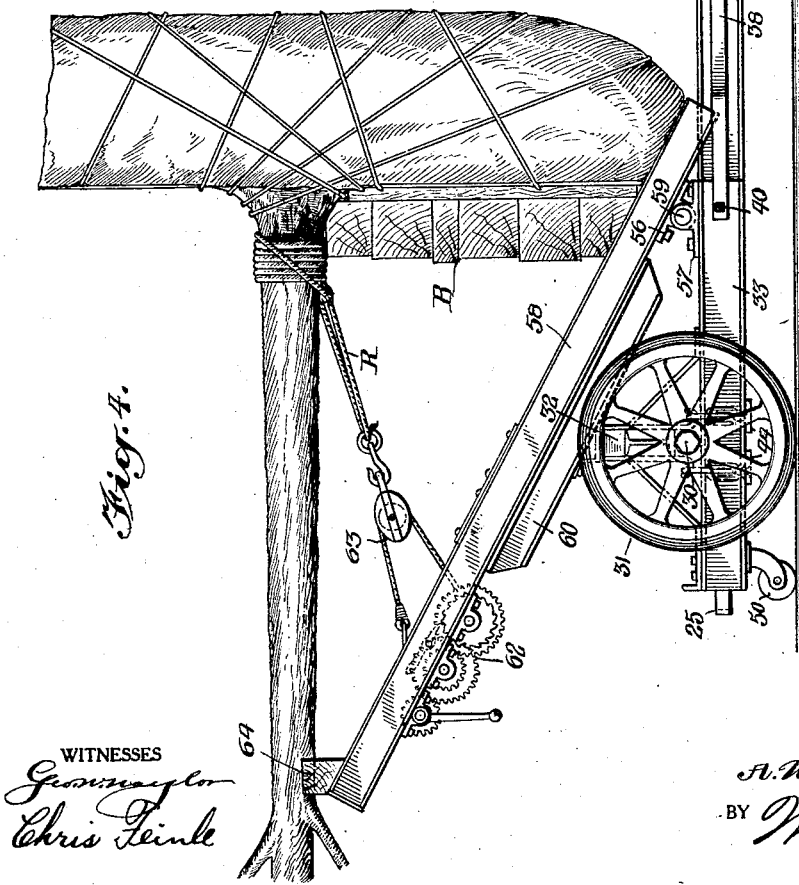
WITNESSES
INVENTOR
A. W. Wadley
BY
ATTORNEYS Patented Sept. 20, 1927.

1,643,141

UNITED STATES PATENT OFFICE.

ALBERT WILLIAM WADLEY, OF YONKERS, NEW YORK.

TREE REMOVER.

Application filed June 24, 1926. Serial No. 118,277.

This invention relates to apparatuses for removing, transporting and transplanting a tree and its bole.

The principal object of the present invention is to produce an improved type of apparatus of the indicated character so as to render the same more thoroughly efficient and effectual for carrying out the divers operations necessary to remove a tree and its bole, its transportation to a new location, and the transplanting thereof.

With the foregoing and other objects in view, the invention resides in the particular provision, relative disposition and functions of the parts hereinafter fully described.

The nature of the invention and its distinguishing features and advantages will appear when the following specification is read in connection with the accompanying drawing, in which—

Fig. 3 is a view of the lifting apparatus in place and showing the manner in which a tree and its bole is lifted preparatory to being swung to a position in which it is supported for transport; the front truck having been disconnected.

Fig. 4 is a side elevation of the tree remover showing a tree and its bole supported and ready to be transported.

Fig. 6 is a sectional elevation of a detail feature.

Figure 1:
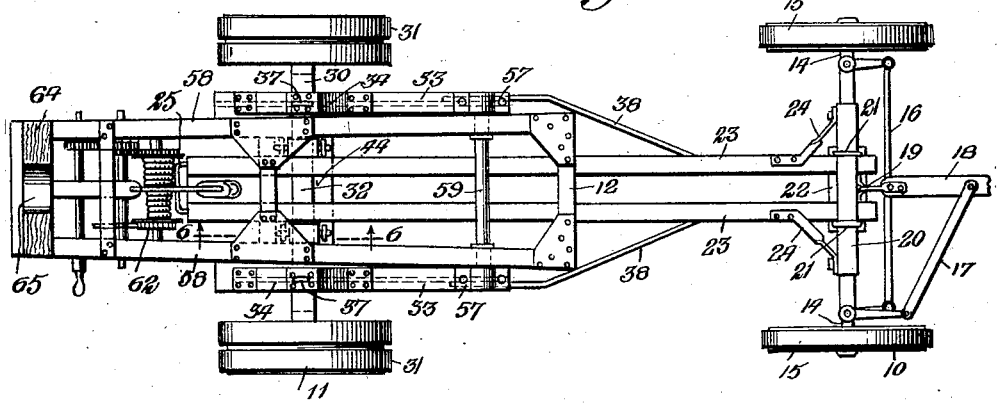
Figure 1 is a plan view of the tree remover embodying the present invention.

Referring now more particularly to the views of the drawings it will be apparent that the tree remover of the present invention considered as a whole is in the form of a trailer comprising a front truck 10, a rear truck 11 and a lever-like frame structure 12 carried by the rear truck 11 for relative movement.

The front truck 10 includes an axle 13 having pivotally connected at each end thereof a spindle 14 on which is mounted a road wheel 15. The spindles 14 are connected together as at 16 so as to move in unison. One of the spindles is connected as at 17 to a tongue 18 so that movement will be imparted to the road wheels 15 upon the lateral movement of the tongue 18. The tongue is connected to the axle 13 as at 19. Arranged on the axle 13 is a bolster 20. U-bolts 21 and a plate 22 are provided which combine to support the front ends of coupling beams 23 to the axle 13 and its bolster 20. Arranged between each of the coupling beams 23 and the axle 13 is a brace 24 rigidly secured in place so as to rigidly attach the coupling beam 23. The rear ends of the coupling beams 23 are connected together by a stirrup 25. This stirrup 25 serves for maintaining the coupling beams 23 in proper relationship with respect to each other, and also serves for the attachment of a rope or chain for moving the front truck in position to be coupled with the rear truck 11.

The rear truck 11 includes an axle 30 having mounted on each end thereof a road wheel 31. A bolster 32 is arranged on the axle 30. Frame beams 33 are connected to and supported from the bolster 32 and this is accomplished by the use of braces 34, each attached to the bolster 32 as at 35 and also attached to its related frame beam 33 as at 36. Each brace 34 has an eye 37. The eyes 37 serve to receive guy ropes to hold the tree rigidly in position while it is being transported from one place to another.

Figures 2, 5:
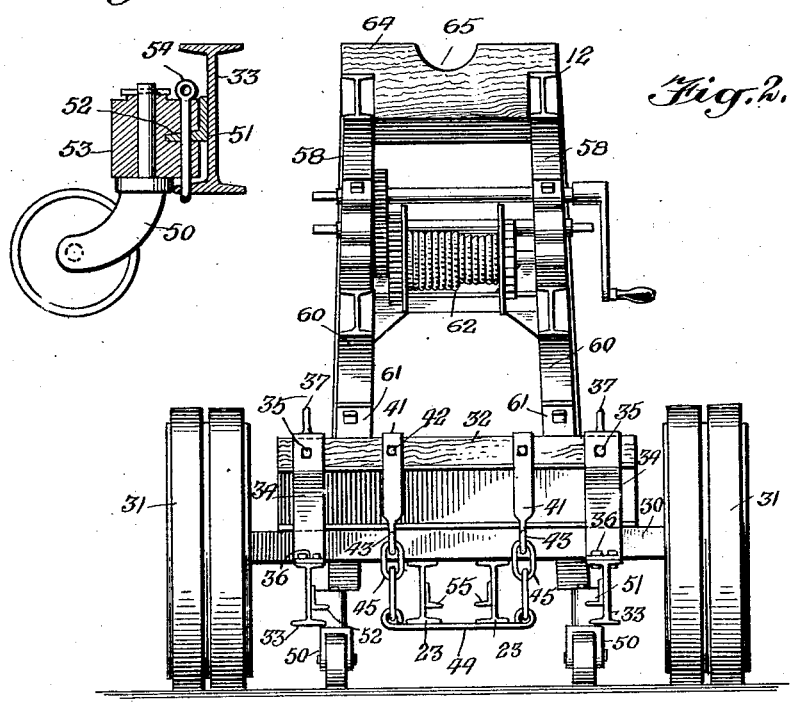
Fig. 2 is a rear end elevation.
Fig. 5 is a sectional view of a detail feature.

In order to couple the front truck 10 to the rear truck 11 there are provided connecting rods 38. A rod 38 is rigidly connected to each coupling beam 23 as at 39, and its opposite end is adapted to be detachably connected to one end of one of the frame beams 33 of the rear truck, use being made of a detachable bolt or other suitable fastening element 40. Thus provision is made for separably connecting the trucks 10 and 11 together. In order to aid the rods 38 there is provided a suspension means for suspending the rear ends of the coupling beams 23. The suspension means includes stirrups 41 rigidly connected to the bolster 32 as at 42. Each stirrup 41 has a pair of hooks 43. Shackles 44 are provided, each of which has end links 45. The shackles 44 combine with the stirrups 41 to support the rear ends of the coupling beams 23, the hooks 43 being engageable respectively with the links 45 of the shackles 44, as shown most clearly in Figs. 2 and 6.

Casters 50 are provided for optional use with the front and rear trucks when each truck is to be moved alone for certain purposes. In order to accomplish this end each frame beam 33 is provided with a knee clip 51 having a portion receivable in a notch 52 in the block 53 of the caster. A coupling pin 54 serves for detachably connecting the block 53 to the knee clip 51. As shown most clearly in Fig. 5 each coupling beam 23 is also provided with a knee clip 55 similar to the knee clips 51 and capable of coacting with the structural features of the casters 50 so as to be operatively secured in place in conjunction with the front truck 10. The frame structure 12 may be of any suitable construction and is preferably of rectangular construction. The said structure 12 is connected for relative movement with respect to the rear truck frame beams 33. This is accomplished by the use of bearings 56 and 57 on the side beams 58 of the structure 12 and the frame beams 33, there being provided a shaft 59 whose opposite ends are journaled in the bearings 56 and 57. Attached to a frame base 60 on each of the beams 58 is an angle knee 61. The angle knees 61 are adapted to rest on the bolster 32 of the rear truck when the frame structure 12 is in its inclined supporting position as shown in Fig. 4. The frame structure 12 carries a crab 62 which cooperates with a tackle 63 for effectively binding the trunk of a tree to the frame structure 12 as illustrated in Fig. 4. Attached to the upper ends of the side beams 58 is a block 64 concaved as at 65 to thus provide a cradle to receive the trunk of a tree.

To remove a tree and its roots and soil which it is desirable to maintain attached to the roots, to transport the tree, roots and soil, and to transplant the same, the trailer apparatus of the present invention is drawn up close to the tree to be transplanted as the first step. The rear truck 11 is then detached by removing the fastening elements 40 of the connecting rods 38. The casters 50 are then attached to the frame beams 33 which puts the rear truck and its lever-like frame structure 12 in condition for the tree lifting operation. This rear truck is moved by man power to the brink of the trench which has been previously dug around the tree. The frame structure 12 is then moved to a tree lifting position as shown in Fig. 3 in which the frame structure will be inclined against the tree. The excess weight will now be forward of the axle 30. As the frame structure 12 tips forward the lower end of the same will be disposed in the trench to engage the roots and soil which are to be removed with the tree. Blocking of wood is now laid on the ground between the trunk of the tree and the frame structure 12. The purpose of this is to avoid crushing the roots and soil at one side. A rope R is coiled about the trunk of the tree near the base and attached to the block of the tackle 63. The crank of the crab 62 it then operated to apply the necessary force to take up all slack. A guy line G is attached to the trunk of the tree above the upper end of the frame structure 12. A pulling force is then applied to the guy line G and as a result the frame structure 12 and the tree will be moved over the rear truck 11; the knees 61 being brought in contact with the bolster 32, to thus effectively support the structure 12. In this condition it will be possible to couple the front truck 10 to the rear truck after which the trailer with the tree properly supported may be transported to the new location where the operations are reversed in transplanting the tree.

From the foregoing it will be apparent that there has been described a combination of appliances which facilitate the tree lifting, transporting and transplanting operation; that means is provided for readily detaching the front truck so that the rear truck and its lever-like frame structure may be utilized for removing a tree and its roots and clinging soil; and that after the tree has been removed it will be possible to readily couple or attach the front truck to the rear truck for the transporting of the tree to its new location.

I claim:

1. For removing, transporting and transplanting a tree and its roots and soil clinging thereto, an apparatus comprising the combination of a front truck, a rear truck, means for detachably connecting said trucks together, a lever-like frame structure carried by the rear truck and connected thereto at one end for relative movement, said frame structure serving for supporting said tree, a tensioning device carried by said frame structure serving to secure the tree thereto, and means on the rear truck which coacts with means on the frame structure for supporting the frame structure in an inclined position over the rear truck.

2. For removing, transporting and transplanting a tree and its roots and soil clinging thereto, an apparatus comprising the combination of a front truck including coupling beams; a rear truck including a bolster; means releasably supporting the rear ends of the coupling beams from said bolster, and a lever-like frame structure carried by the rear truck and connected thereto at one end for relative movement, said frame structure serving for supporting said tree, a tensioning device carried by said frame structure serving to secure the tree thereto, and means on the rear truck which coacts with means on the frame structure for supporting the frame structure in an inclined position over the rear truck.

3. In a tree removing, transporting and transplanting apparatus, a front truck, a rear truck, a lever-like frame connected with the rear truck, said front truck including coupling beams, said rear truck including frame beams spaced far enough apart so that said coupling beams may be arranged therebetween and rods rigidly connected to said coupling beams respectively and adapted to be connected to said frame beams respectively, and means cooperating with said rods for detachably connecting them to said frame beams.

4. For lifting a tree and its roots and clinging soil, a truck, a lever-like frame arranged on the truck and connected thereto at one end for movement with respect thereto to a position for the tree lifting operation, said frame also movable to a position over the truck, and means supporting said frame in an inclined position.

5. For lifting a tree and its roots and clinging soil, a truck including a bolster and frame beams; and in combination, a lever-like frame structure connected at one end to the frame beams for relative movement, said frame structure being movable to a position for the tree lifting operation, said frame structure also movable to a supporting position over the truck, said frame structure having knees adapted to rest on said bolster to support the frame structure in an inclined position.

6. For lifting a tree and its roots and clinging soil, a truck including a bolster and frame beams; and in combination a frame structure, a connection between the free ends of the frame beams and the frame structure so that an end portion of the frame structure will be disposed between the extremities of the free ends of the frame beams, said connection permitting the frame structure to have pivotal movement, said frame structure being movable to a position for the tree lifting operation, said frame structure also movable to a supporting position over the truck, said frame structure having angle knees adapted to rest on said bolster to support the frame structure in an inclined position.

7. In an apparatus of the class described including a front truck and a rear truck separably connected together, traction means, a lever-like frame connected with the rear truck, and means on each of said trucks which coacts with said traction means for optionally connecting the traction means to either of said trucks so that each may be used separately.

ALBERT WILLIAM WADLEY.